United States Patent Office 2,765,310
Patented Oct. 2, 1956

---

2,765,310

CATALYTIC DEHYDROGENATION OF PIPERIDINE TO PYRIDINE

Sydney Horrobin, Blackley, Manchester, England, assignor to Imperial Chemical Industries Limited, a corporation of Great Britain No Drawing. Application June 11, 1954,
Serial No. 436,232

Claims priority, application Great Britain June 19, 1953

7 Claims. (Cl. 260—290)

This invention relates to catalytic dehydrogenation of piperidine.

It is already known that the dehydrogenation of piperidine to pyridine can be effected in the vapour phase by treatment with hydrogen in the presence of a platinum or palladium catalyst. However in such a process catalysts based upon metals of the platinum group have hitherto all proved to be extremely sensitive to poisoning so that their activity rapidly subsides.

It has now been found that the poisoning of such catalysts can be minimised and that excellent conversion of piperidine to pyridine can be achieved by the use of large proportions of hydrogen.

According to the present invention there is provided a process for the catalytic dehydrogenation of piperidine to pyridine by passing piperidine vapour and hydrogen over a platinum or palladium catalyst characterised in that at least seven molecular proportions of hydrogen are used per molecular proportion of piperidine.

Any form of platinum or palladium catalyst may be used in the process of this invention. There may be used platinised or palladised asbestos, or platinum or palladium on carbon.

The process of the invention is performed at elevated temperatures of from 200° C. to 500° C. and preferably from 300° C. to 400° C.

The proportion of hydrogen may be greater than seven mols. per mol. of piperidine. With advantage, 10 mols. or more can be used.

By the use of the high proportion of hydrogen in the process of this invention, piperidine can be converted with a high degree of conversion to pyridine. In consequence of the low proportion of high boiling impurities in the product, the poisoning of the catalyst is minimised.

The invention is illustrated but not limited by the following example in which parts and percentages are by weight.

Example

A palladium on asbestos catalyst is prepared by known methods.

12 parts of asbestos containing 5% palladium are placed in a glass tube surrounded by an electrically heated furnace. Hydrogen is passed whilst the temperature is raised to 350° C., and thereafter for half an hour at this temperature. The hydrogen flow rate is increased to 1.6 parts per hour and piperidine vapour, at the rate of 6 parts per hour, is introduced. The product is collected in cooled receivers. In four hours the conversion of piperidine is almost 100% and the yield of pyridine 94%.

What I claim is:

1. Process for the catalytic dehydrogenation of piperidine to pyridine by passing piperidine vapour and hydrogen over a catalyst selected from the group consisting of platinum and palladium characterised in that at least seven molecular proportions of hydrogen are used per molecular proportion of piperidine.

2. Process for the catalytic dehydrogenation of piperidine to pyridine as claimed in claim 1 wherein the process is performed at elevated temperatures of from 200° C. to 500° C.

3. A process according to claim 2, where the temperature is from 300° to 400° C.

4. A process according to claim 3, wherein there are used at least ten molecular proportions of hydrogen per molecular proportion of piperidine.

5. A process according to claim 4, wherein the catalyst is palladium, the temperature is 350° C. and the hydrogen flow is at a rate of 1.6 parts by weight per 6 parts by weight of piperidine.

6. A process according to claim 1, wherein the catalyst is palladium.

7. A process according to claim 6, wherein the temperature is from 300° to 400° C.

References Cited in the file of this patent

UNITED STATES PATENTS 2,019,883    Wulff et al. _____ Nov. 5, 1935

OTHER REFERENCES

Zelinsky et al.: Berichte 57:669–671 (1924).